Figure 26:
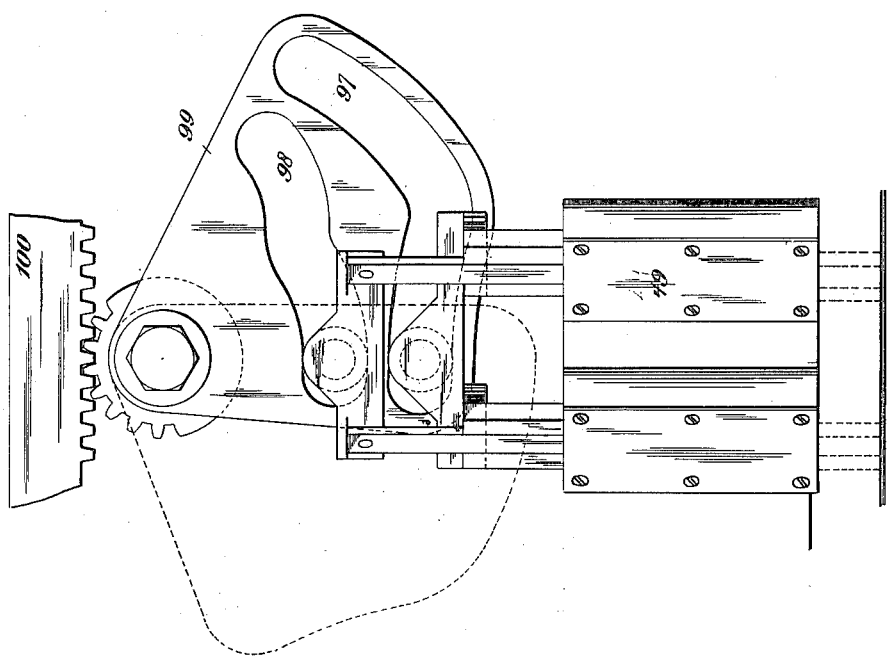

No. 680,721. Patented Aug. 20, 1901.
S. D. LOCKE.
BASKET MAKING MACHINE.
(Application filed May 20, 1899.)
(No Model.) 10 Sheets—Sheet 1.
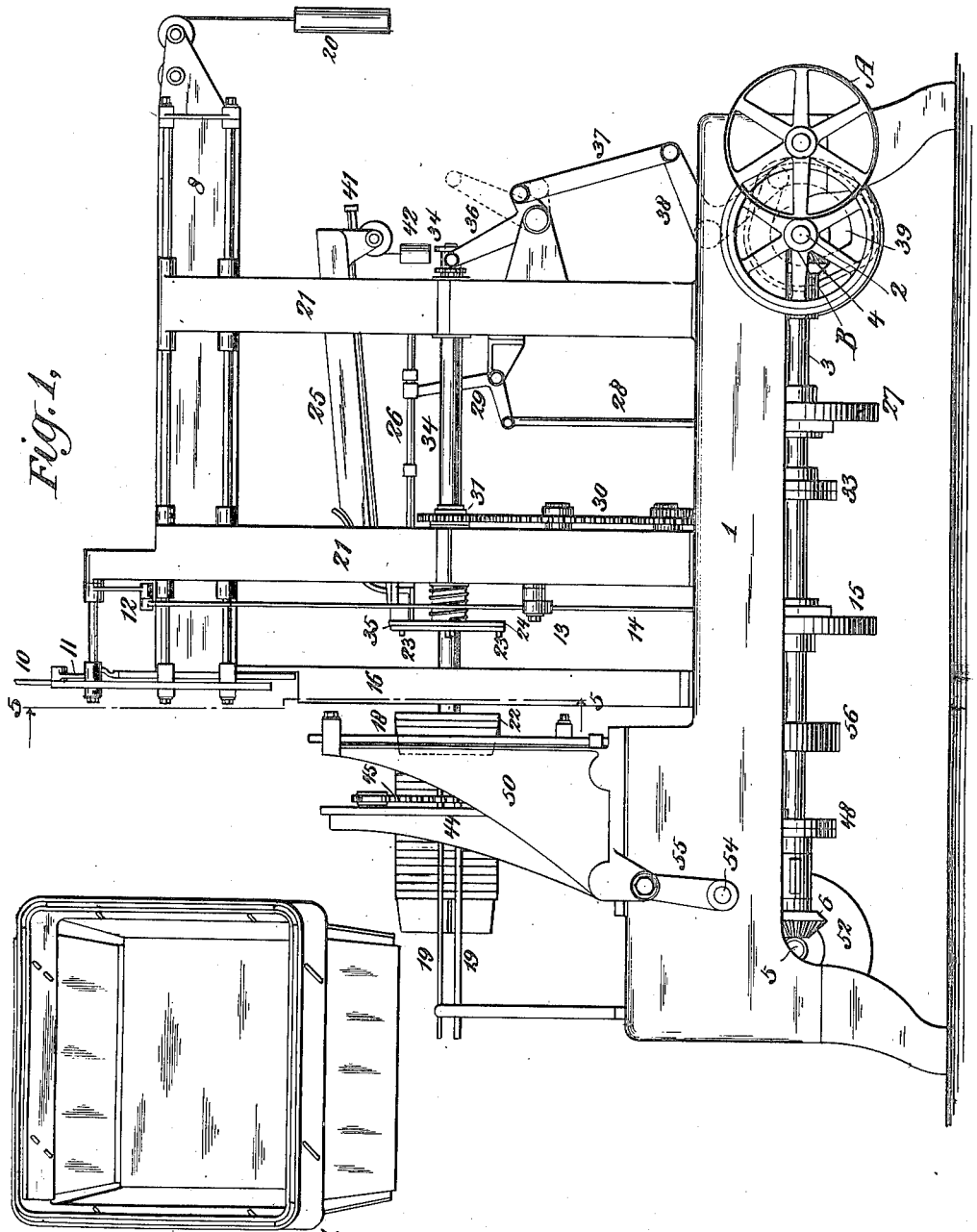

No. 680,721. Patented Aug. 20, 1901.
S. D. LOCKE.
BASKET MAKING MACHINE.
(Application filed May 20, 1899.)
(No Model.) 10 Sheets—Sheet 2.
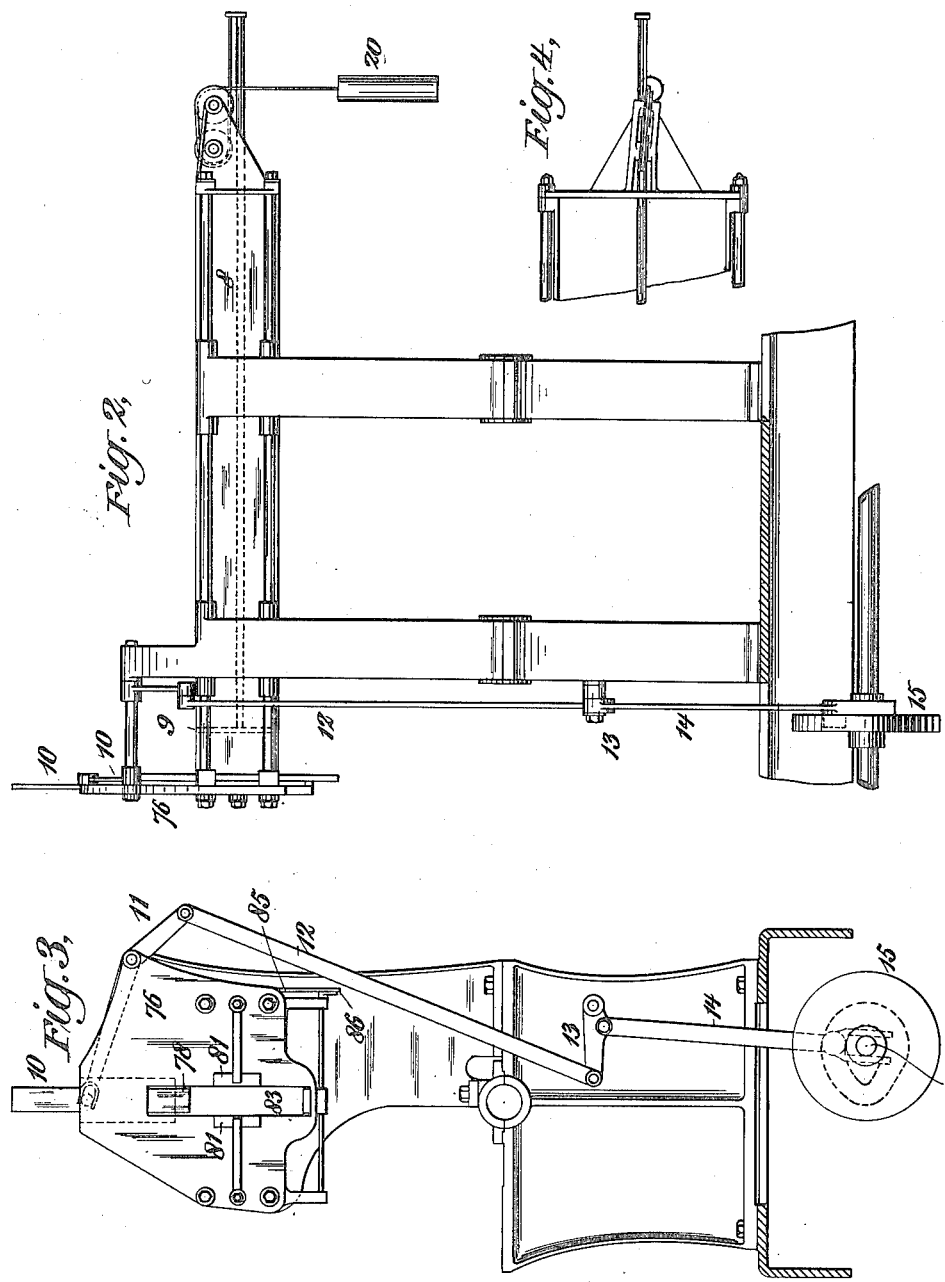
Witnesses
Carlos de León
C. D. Lasley
Sylvanus D. Locke Inventor
By his Attorneys
Baldwin, Davidson & Wight

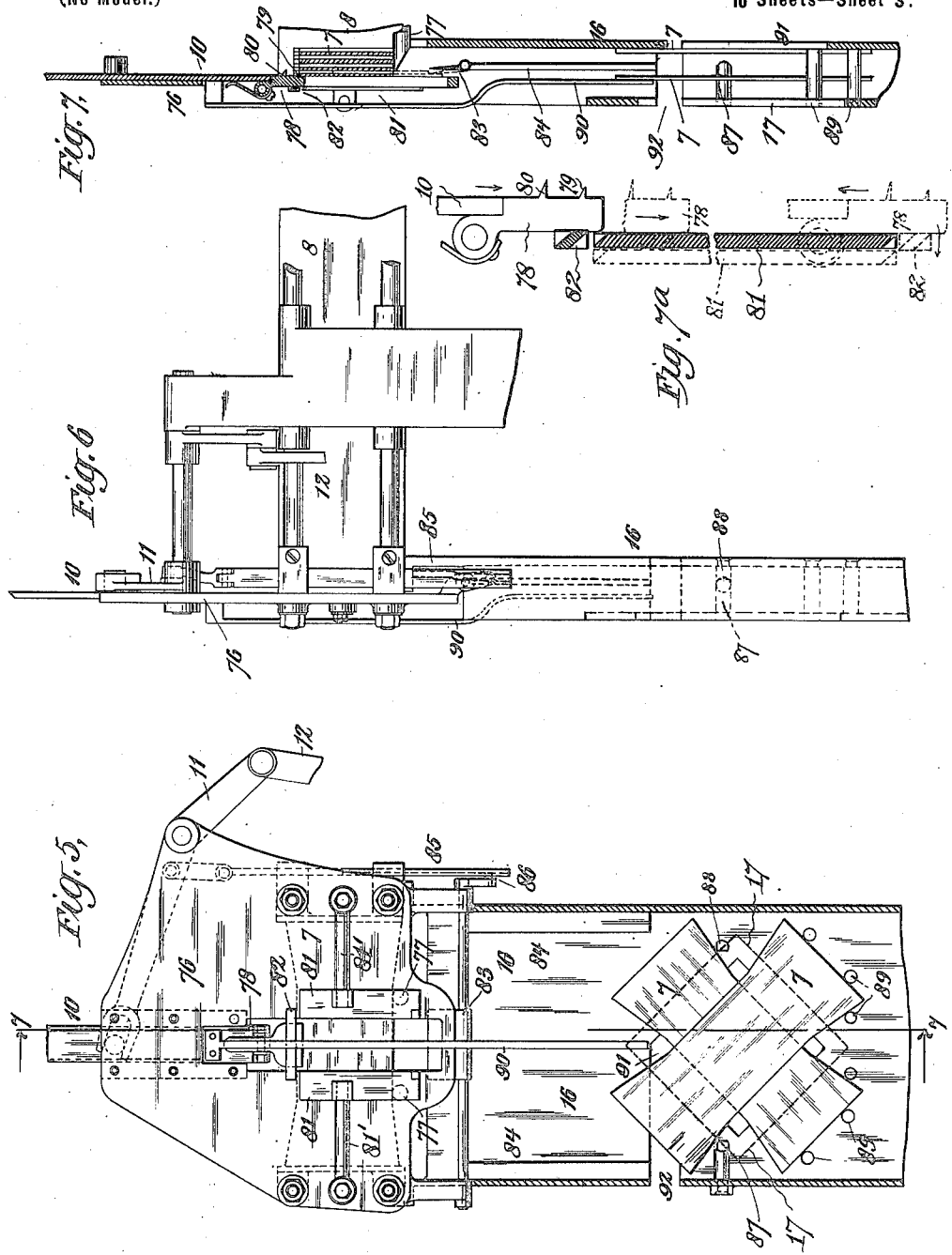

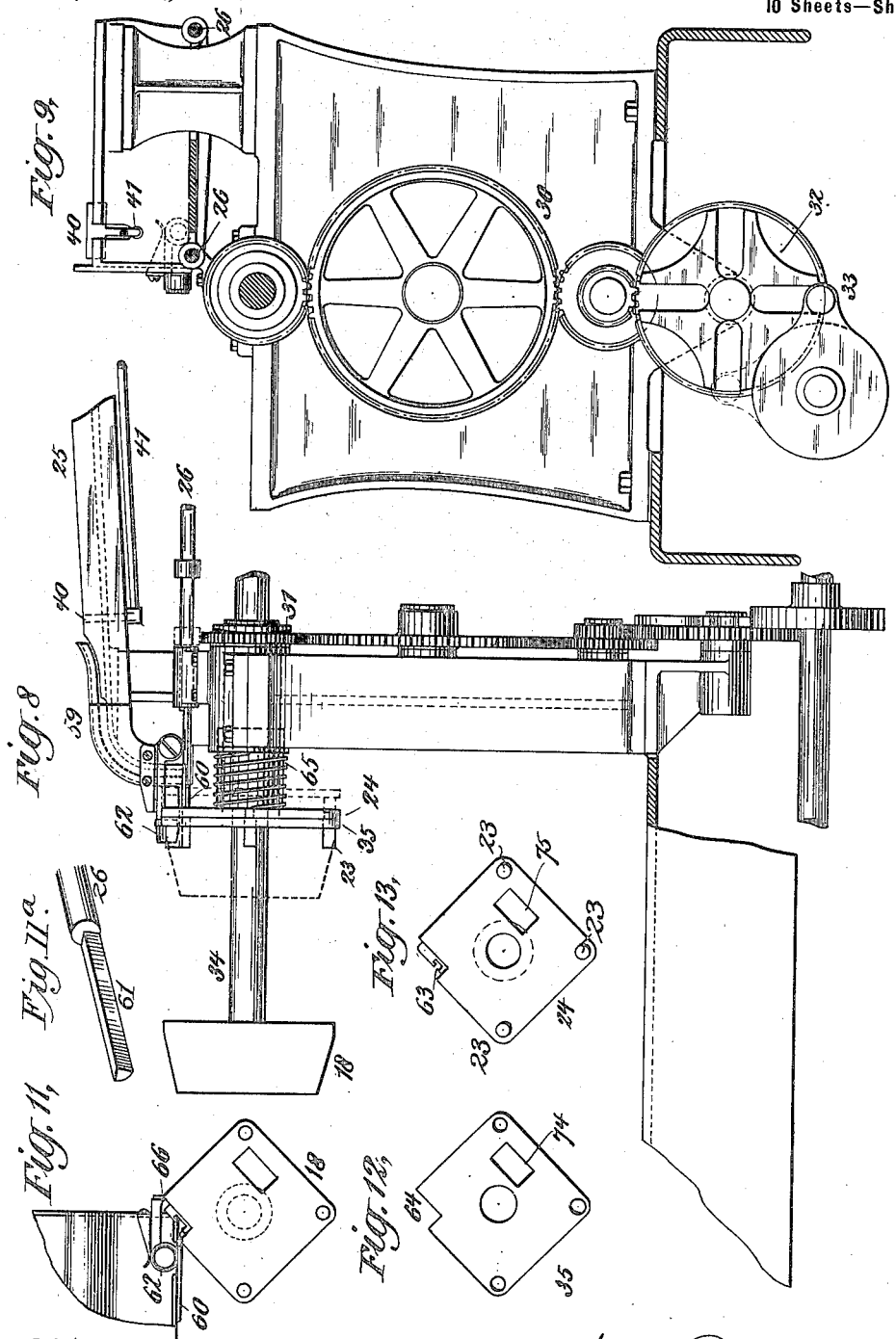

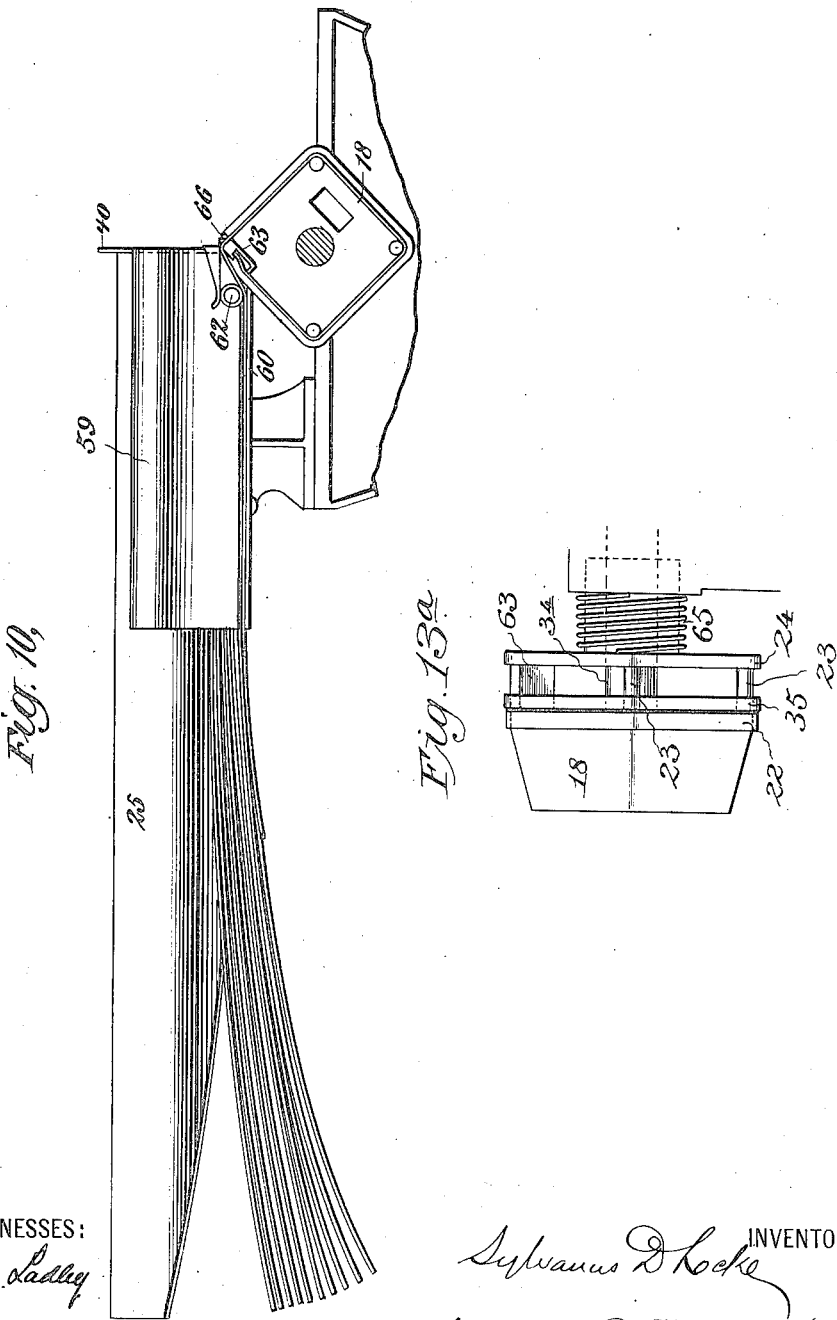

No. 680,721. Patented Aug. 20, 1901.
S. D. LOCKE.
BASKET MAKING MACHINE.
(Application filed May 20, 1899.)
(No Model.) 10 Sheets—Sheet 6.
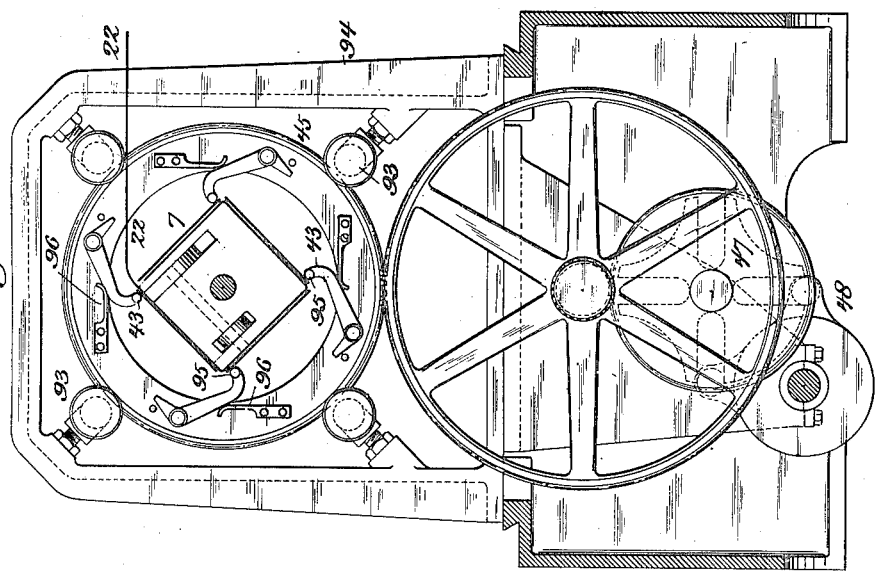
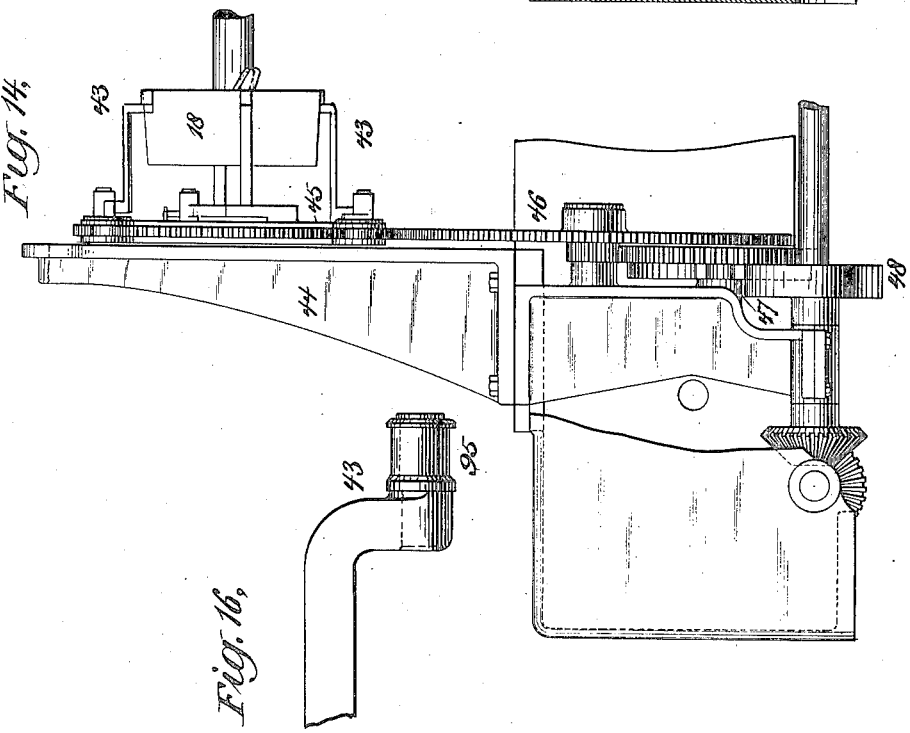
Witnesses
Sylvanus D. Locke Inventor
By his Attorneys

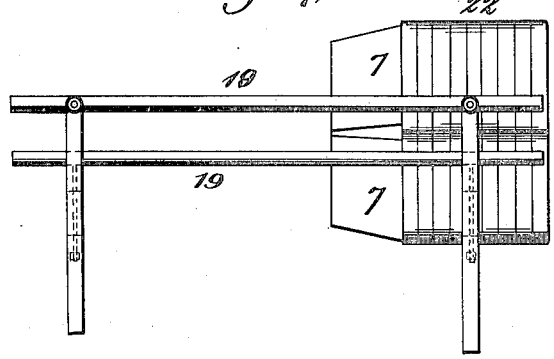
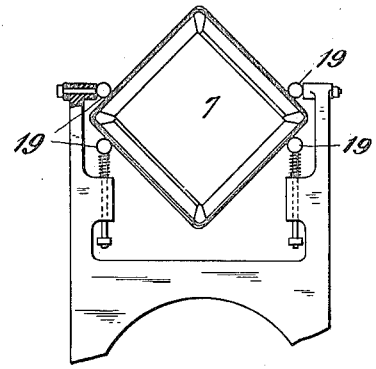
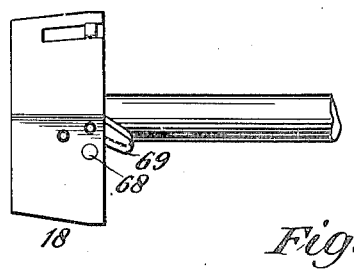
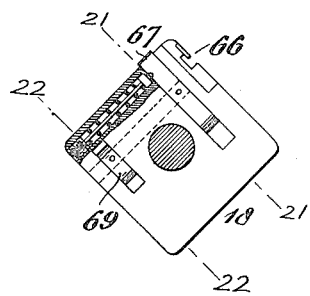
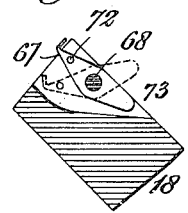
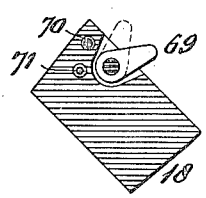

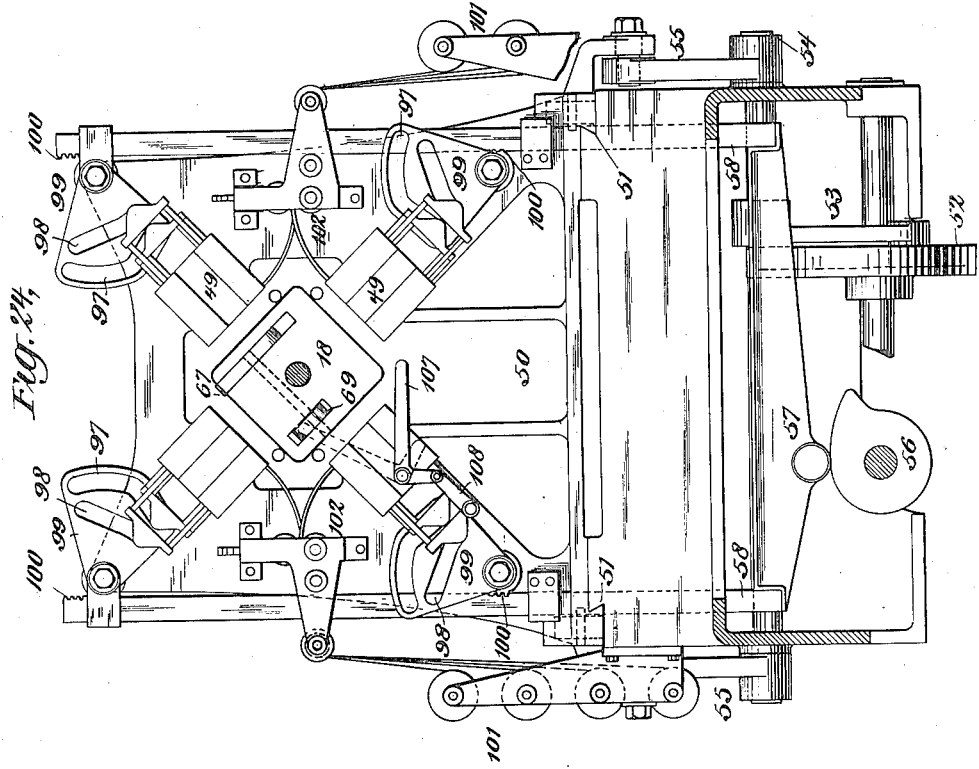

No. 680,721. Patented Aug. 20, 1901.
S. D. LOCKE.
BASKET MAKING MACHINE.
(Application filed May 20, 1899.)
(No Model.) 10 Sheets—Sheet 9.

Witnesses
Sylvanus D. Locke Inventor
By his Attorneys

No. 680,721. Patented Aug. 20, 1901.
S. D. LOCKE.
BASKET MAKING MACHINE.
(Application filed May 20, 1899.)
(No Model.) 10 Sheets—Sheet 10.
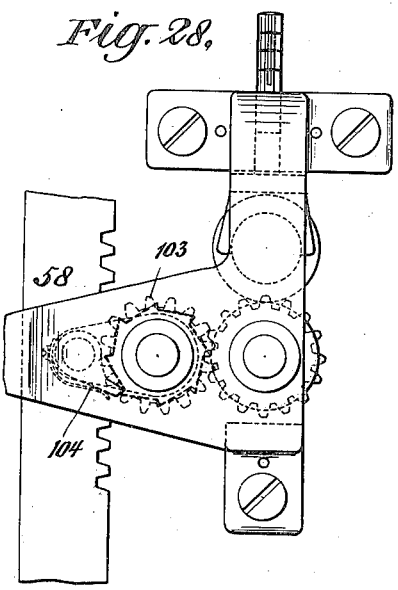
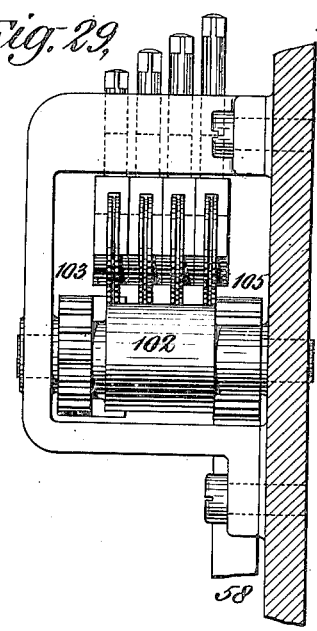
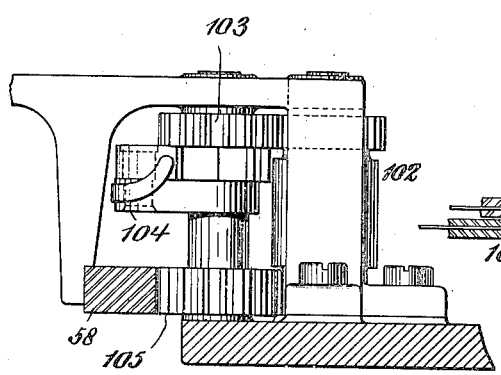
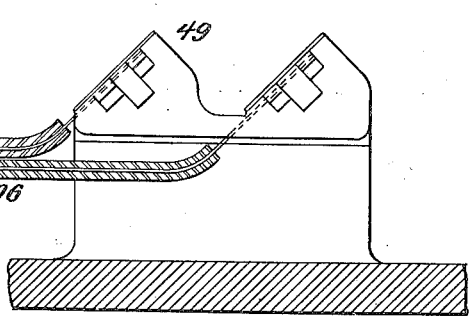

UNITED STATES PATENT OFFICE.

SYLVANUS D. LOCKE, OF BROOKLYN, NEW YORK, ASSIGNOR TO THE HORTON BASKET MACHINE COMPANY, OF NEW YORK, N. Y.

BASKET-MAKING MACHINE.

SPECIFICATION forming part of Letters Patent No. 680,721, dated August 20, 1901.

Application filed May 20, 1899. Serial No. 717,632. (No model.)

*To all whom it may concern:*

Be it known that I, SYLVANUS D. LOCKE, a citizen of the United States, residing in the borough of Brooklyn, New York, county of Kings, State of New York, have invented certain new and useful Improvements in Basket-Making Machines, of which the following is a specification.

The machine for making baskets forming the subject of this invention is designed to make automatically that kind of basket composed of wood blanks or veneers constituting the bottom and sides and a wood-strip binding applied to the edges of the sides and secured thereto by nails or staples.

The machine comprises a hopper for the wood blanks or veneers, means for feeding the blanks two at a time and presenting them to the forming mechanism in proper position to be formed into a basket, a band-holding hopper and means for discharging the bands singly therefrom, a device for taking each band as discharged from the hopper and folding it or bending it into shape to conform to the interior edge of the basket-opening, a plunger or former provided with means for taking and actuated to take the partly-folded band from the forming device, leaving the free end of the band extending sidewise from the plunger and to act on the two arranged wood blanks or veneers so as to cause them to be folded against the sides with the edges of the sides of the blanks adjacent to the part of the band now on the plunger, a basket holder or rack into which the baskets are placed by the plunger, a series of folding-fingers surrounding the basket-rack and baskets held therein arranged and actuated to fold or bend the extending part of the band around the basket outside the upper edges of the opening, and a series of nailing or stapling devices constructed to be brought into position to act and operated to act to drive nails or staples through the outside and inside folds of the band and the edges of the basket that are held between said folds while the plunger remains in the basket.

One of the principal features of the invention is the utilization of each of the baskets as formed as a holder or mold for the succeeding basket to press the sides against the plunger and complete the shaping of it and to hold it during the final band-wrapping and nailing processes, said baskets being nested in the rack as formed by the plunger.

The machine also embraces mechanism of suitable construction for imparting movement to the various devices, so that they will operate in proper sequence to perform their functions in the automatic formation of the baskets, and also many novel features in the detail of the various parts, all of which will be fully described by reference to the accompanying drawings, in which—

Figure 25:
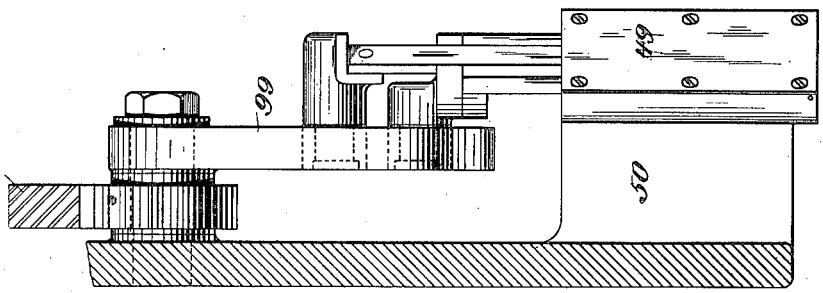

Figure 1 is a side elevation of the machine, showing generally the arrangement of the different parts and mechanisms for operating them. Fig. 2 is a side elevation of the wood blank or veneer holder and feeding device. Fig. 3 is an elevation of the front or left-hand end of Fig. 2. Fig. 4 is a plan of the right-hand end portion of Fig. 2. Fig. 5 is an enlarged view of the upper part of Fig. 3, showing also the chute down which the blanks or veneers fall, the front of said chute being removed and the view being taken on the line 5 5, Fig. 1. Fig. 6 is a side elevation of Fig. 5. Fig. 7 is a section taken on the line 7 7, Fig. 5. Fig. 7ᵃ is an enlarged detail view showing the action of the pusher that takes the basket-blanks from their hopper. Fig. 8 is an enlarged side view of the devices for feeding the bands and partly forming them. Fig. 9 is an end elevation of the right-hand end of Fig. 8. Fig. 10 is an elevation of the front or left-hand end of the band-hopper; Fig. 11, a front view of the plunger and part of the band-hopper shown in Fig. 8. Fig. 11ᵃ is an enlarged detail view of one of the rods that push the bands from the hopper. Fig. 12 is a front view of the forward plate of the band-forming device. Fig. 13 is a similar view of the rear plate of the device. Fig. 13ᵃ is an enlarged detail view showing the band holding and winding devices with the plunger retracted to transfer the band from the winding devices to the plunger. Fig. 14 is an enlarged side elevation of the means for completing the formation of the bands around the boxes. Fig. 15 is a right-hand end elevation of Fig. 14. Fig. 16 shows one of the band-forming rollers detached. Fig. 17 is a side elevation of the rack or holder into which the boxes are passed after being formed. Fig. 18 is a right-hand end view of the same. Fig. 19 is a detached side view of the plunger upon which the boxes are formed. Fig. 20 is a rear end view of the same. Fig. 21 is a sectional projection of Fig. 20 on the line 21 21. Fig. 22 is a sectional projection of Fig. 20 on the line 22 22. Fig. 23 is an enlarged side elevation of the nailing mechanism for securing the bands to the boxes. Fig. 24 is a right-hand end elevation of Fig. 23. Fig. 25 is a side view, on a further-enlarged scale, of one of the nailing devices. Fig. 26 is a front elevation of the same. Figs. 27, 28, and 29 are enlarged side elevation, front elevation, and plan, respectively, of the wire-feeding devices of the nailing mechanisms. Fig. 30 shows the manner in which the wire is guided to the staple-forming devices of the nailing mechanisms, and Fig. 31 represents a basket made by the machine forming the subject of this invention.

The general character of the machine is such as to form baskets like that shown at Fig. 31, comprising a bottom and sides of veneer and a band around the edges of the opening for binding the sides together, and the arrangement of the various devices and parts and their actuating mechanisms is set out in Fig. 1, omitting many of the details of construction which are particularly shown in other views of the drawings and which will be referred to after the brief description of the machine and the functions and operations of the various devices composing the same.

All of the parts are carried or supported by a main frame 1. The driving-gear, comprising the laterally-arranged shaft 2, the longitudinal shaft 3, driven from the shaft 2 by means of a pair of bevel or miter gears 4, and the laterally-arranged shaft 5, driven from the shaft 3 by means of a pair of bevel or miter gears 6, has its bearings in the lower part of the frame 1 and carries the actuating devices—as cams, &c.—of the various parts of the machine. The shaft may be driven by a gear A, meshing with pinion B on the shaft, and the shaft of the gear A may carry a driving-pulley or receive power in any suitable way.

The wood blanks or veneers, of which the bottom and sides of the baskets are formed, as shown at 7 7, Fig. 5, are placed side by side in the blank-hopper 8 and are pressed toward the left-hand end of the hopper by the plunger 9, Fig. 2, which is under the continual action of the weight 20 to so press the blanks forward. Two of said blanks at each revolution of the machine are discharged from the hopper 8 by the feeding-slide 10, actuated through the system of levers and rods 11, 12, 13, and 14 by the cam 15, which is secured to the shaft 3. These two discharged blanks fall down the chute 16, assuming the positions shown in Fig. 5 before a rectangular opening in the front of the chute, (indicated by the dotted lines 17,) and from this chute the said two blanks 7 7 are carried forward by the plunger 18, the side of said rectangular opening partially completing the folding of the blanks (which may be scored, if desired) against the side of the plunger. The body of the basket thus formed is passed into the basket rack or holder, which consists of horizontally-arranged rods 19 19, arranged to grasp the baskets at their corners, and the baskets as each one is formed and passed into the holder constitute a mold for the proper complete formation of a succeeding basket and a holder for it while the retaining-band is being wrapped around it and secured by the nails or staples. Before starting the machine to make baskets a nest of previously-completed baskets would be placed in the holder. The blank-hopper 8 is supported at the upper part of the machine by the standards 21 21 of the frame. Before the plunger 18 passes through the chute 16 to carry the two blanks 7 7 therefrom, as just described, it has received around its rear end a band 22, which passes into the box formed on the plunger just within the edges of its opening, said band now extending through one corner of the box away from the side of the plunger, as shown at Fig. 15, this extending end of the band being sufficiently long to be wrapped around the outside of the box in a manner hereinafter described. The plunger receives the band 22 from the band-forming pins 23, which are carried by a spring-actuated plate 24 when the plunger is in its rearward position, and said pins 23 receive the band from the hopper 25 through the medium of a feed device, the pushers of which are carried on the sliding rods 26, operated from the cam 27, carried by the shaft 3, through the intermediary of the rod 28 and bell-crank lever 29. This plate 24 is provided with a gripping device to grasp the end of the band and is rotated one full revolution after having grasped the end of the band to cause the band to be wrapped around pins 23. This rotation of the plate 24 is effected by the train of gear-wheels 30, the last one of which is secured to a sleeve 31, fitted to run in a bearing in one of the standards 21, and to this sleeve the plate 24 is so attached as to be rotated therewith. The first gear-wheel of the train 30 has attached to it a four-slotted star-wheel 32, into the slots of which a crank-pin 33, carried by the shaft 3, plays, the arrangement being such and the gears of the train of wheels 30 being so proportioned that for one-quarter of a revolution of the shaft 3 the plate 24 is caused to make one full revolution and to remain stationary during the time the shaft 3 makes three-quarters of a revolution to complete a full turn. (See Fig. 9.) The plunger 18 is carried on the end of rod 34, fitted to slide without rotation in bearings formed in the standards 21 21, said rod passing centrally through the sleeve 31, so that the plunger in its backward movement comes truly against the ends of the pins 23 to press them through the plate 35, which is secured to the sleeve 31, and so slip into the band formed or folded around the pins, the plunger being provided with suitable gripping devices by means of which the band is held thereto and carried forward on the plunger, as before described. The means adopted for imparting a backward-and-forward movement to the plunger 18 consist of a bell-crank lever 36, the long arm of which is attached to the rear end of the rod 34. A rod or link 37 connects the short arm of the bell-crank lever 36 to the bell-crank lever 38, and a cam 39, secured to the shaft 2, is arranged to act on the other arm of the bell-crank lever 38. The bands 22 are set up on edge in the hopper 25 and are pressed forward toward the discharge end of the hopper by the plunger 40, carried on the end of a rod 41, the outer end of which is under the influence of the weight 42 to cause a constant pressing-forward movement of the plunger 40. When a box formed on the plunger 18 has been carried forward and pressed into the previously-formed box now held in the rack-rods 19 19, with a portion of the band 22 inside the box and with the end of the band extending from the box and side of the plunger, as shown at Fig. 15, said box is in position for the band-wrapping fingers 43 of the second wrapping device 33 to act on the extended end of the band and fold it around the outside of the box, the extent of such folding being as much, if desired, as one and one-quarter turns, as shown in the completed basket, Fig. 31. The band-wrapping fingers 43 of this second band-folder are carried by a ring 45, through which the baskets as they are made are passed, and this ring 45 is caused to be rotated through a train of gear-wheels 46, the last and largest one of which meshes into gear-teeth formed on ring 45 and the first one of which carries a four-slotted star-wheel 47, into the slots of which a crank-pin 48, carried by the shaft 3, plays. The next and last operation to complete the baskets is nailing or stapling the band 22 to the edges of the veneers 7 7, forming the body of the baskets. This is accomplished by means of staple forming and driving devices 49, carried by a head 50 and arranged to drive staples through the band 22 and the edges of the box embraced by the bands on all sides of the boxes after the band has been wrapped around the box by the fingers 43. This stapling-head 50 is fitted to slide in ways 51, formed on the main frame 1, in a direction parallel to the travel of the boxes as they are formed, and it is controlled and actuated from the shaft 5 through the medium of the cam 52, which is secured to this shaft, the swinging arm 53 on the shaft 54, operated by the cam, and the arms 55 55 on the ends of the shaft 54, whose ends are connected to the sides of the head 50. This head is by these means moved and held away from the edge of the box last formed while the fingers 43 are folding the band 22 around the box and is moved forward, as shown in Fig. 1, after the folding of the band is accomplished, so as to bring the staple forming and driving devices in position for them to act in driving the staples through the band. The staple forming and driving devices 49 are operated by means of the cam 56, secured to the shaft 3, acting on the roller 57, which is carried by sliding bars 58 58, constructed to impart motion to the stapling devices, and this cam 56 is sufficiently wide to afford contact with the roller 57 and with the head 50 in its different positions.

The actuating devices of the various parts of the machine are so arranged and timed on the driving-shaft that the said various parts perform their functions in regular sequence to cause the boxes to be automatically formed and completed, a box being made for each full revolution of the machine so long as the blank-hopper 8 and band-hopper 25 are kept supplied with blank veneers and bands, respectively.

To describe in detail the different parts of the machine, I will first refer to the mechanisms for feeding and preliminarily forming the bands.

The hopper 25 is sufficiently wide at its rear part to support the bands 22 throughout their whole length, which are set up on edge in the hopper; but it is narrowed at its front end and the bottom cut away to allow the bands to separate at their free ends, so as to facilitate the feeding of them longitudinally forward, as shown at Fig. 10. The front end of the hopper is formed with a continuous curve extending through an angle of ninety degrees and having for a certain distance of the width of the hopper a curved guard-plate 59 and a projecting bed-plate 60 at the feeding side of the hopper. The bands 22 as they are pushed forward by the plunger 40 change from a vertical to a horizontal position. The lower band at the bottom of the bend is pushed forward by the ends of the rods 26, which are shaped, as shown at 61, Fig. 11$^a$, out of the hopper, with the feeding end resting on the bed-plate 60 under the spring-actuated roller 62, the edge of this bed-plate 60 being cut away, so as to leave the extreme end of the band which is fed forward free. The roller 62, as seen in Figs. 8 and 11, is tapered toward its ends from its central circumferential zone and the end of the band readily passes under it. This free end of the band is caused to enter the cramping-jaw 63, formed on the plate 24, which jaw extends from the face of this plate through the cut-away corner 64 of the front plate 35, from the face of which it projects to an equal extent, as do the pins 23 23 when the plate 24 is held against the plate 35 by the spring 65, which surrounds the sleeve 31, as shown at Fig. 8. With the end of the band engaged in the cramping-jaw 63 the plates 24 and 35 are caused to be rotated in the manner before described, thus wrapping the band around the pins 23, as shown at Fig. 10. The rectangular tapered plunger 18, corresponding to the interior of the basket made thereon, now moves back, and its rear face coming in contact with the pins 23 and cramping-jaws 63 forces them rearwardly through the front plate 35, thereby transferring the band then formed or partly wound around the pins onto the rear edge of the plunger. The plunger is provided with a cramping-jaw 66, which comes against and is in alinement with the jaw 63 when the above-described transference of the band to the plunger is occurring. The end of the band lying in the jaw 63 during the transference of the band to the plunger is pushed out of the jaw 63 and into the jaw 66 by the band behind it, which is then being moved forward by the ends 61 of the pushers 26 into the cramping-jaw 63. To hold the free part of the band onto the plunger 18, a gripping-jaw 67 is fitted to rock in a slot formed in the plunger and arranged so that its flat jaw will extend out of the plunger to grip and hold the band against it, as shown at Figs. 15, 19, 20, and 21, and in another position will be within the slot, as shown by the dotted lines in Fig. 21. This gripping-jaw 67 is carried by a short shaft 68, fitted in the plunger, and to the other end of this shaft is secured an arm 69, which projects from the rear face of the plunger. Two spring-actuated pins 70 and 71 are located in the plunger in such positions that their ends will snap into a recess or hole 72, formed in the side of the gripping-jaw 67 to respectively hold said jaw in its outer and inner positions. Now this gripping-jaw 67 is actuated to grip and hold the band onto the plunger when the plunger approaches the plate 35 by its tail end 73 coming in contact with the face of the plate 35, which tail end extends beyond the rear face of the plunger when the jaw is within the plunger, as shown by the dotted lines in Fig. 21, and to permit of the free movement of the arm 69 during such action of the gripping-jaw the plates 35 and 24 are perforated, as at 74 and 75, respectively, into which perforations said arm enters and is free to move without contacting with the plates. The object of this arm 69 is to provide means for moving the gripping-jaw from its active into its inactive position, which movement is required to take place when the basket is formed about the plunger and before it is withdrawn after the band is properly applied to the basket, and this retraction of the gripping-jaw is brought about in a manner hereinafter explained.

The next part of the machine to be described is the device for feeding the wood blanks or veneers 7 7 into position for the plunger 18 to act on them, and this feeding has to occur while the plunger is behind the chute 16. These blanks are packed on edge in the hopper 8 and are passed forward, as before described, so that the front one rests against the front plate 76, the lower edges of the blanks resting on the two rods 77, beveled at the discharge end and extending through the length of the hopper-bottom and whose points are distant from the plate 76 equal to the thickness of two of the blanks, so that two blanks may be fed down between the plate 76 and the supporting-rods 77. In guides on the rear of the plate 76 is fitted the vertically-arranged slide 10, having a pin connection with the lever 11 and having a spring-actuated pivoted pusher 78 at its lower end provided with two sets of feeding-teeth, the one set 79 being near the lower end of the pusher and projecting therefrom, so as to catch against and act on the front blank only, and the other set 80 being above the lower set 79 and long enough or projecting sufficiently far from the pusher to catch against the upper edge of the second blank in the hopper. The front plate 76 is slotted, and at the edges of this slot are located resilient plates 81 81, carried by bars 81' 81', over which slide the bar 82, attached to the pusher 78, when the slide 10 is rising, the lower and upper edges of the plates 81 81 and the bar 82 being suitably beveled to cause the bar to so ride over the plates and hold the pusher away from the blanks when the pusher is rising and to cause the bar to slide along the inner sides of the plates, slightly springing the plates outwardly, when the pusher is descending and to so cause two of the blanks to be carried out of the hopper by the pusher. The chute 16 is a rectangular case immediately below the discharge end of the hopper 8, and into this chute two of the blanks are carried by the pusher 78 during its descent, the front blank being carried by the teeth 79 somewhat ahead of the second, as shown at Fig. 7, and at a certain point of the downward movement of the two blanks the divider 83 is swung forward, so as to bring its sharp edge against the forward part of the first blank, and so cause the second blank to pass behind the divider and behind the side flanges 84 84 of the chute, the front blank passing down in front of the divider and said flanges, thus causing a complete separation of the blanks in the chute. This divider is actuated at the required time by means of a cam-slot formed in the vertically-moving slide 85, into which slot extends a pin projecting from the arm 86, secured to the end of the shaft of the swinging divider, which extends from the side of the chute, the vertically-moving slide 85 receiving its motion from the lever 11 by means of a link connection. The blanks 7 7 are caused to assume the diagonal positions shown in Fig. 5 by their lower edges at their opposite ends striking the pins 87 and 88. The pin 87, which arrests one end of the front blank, extends from the side wall of the chute, (and is turned at right angles at its end,) with sufficient space between it and the rear wall for the rear blank to pass between them, and the pin 88, which arrests the opposite end of the rear blank, extends from the rear wall, leaving a space between it and the front wall for the front blank to pass between them. These two pins 87 88 are formed with sharp edges sufficiently acute to dent the edges of the blanks to cause them to turn on said pins as centers, thus holding the arrested ends from farther descent and allowing their other ends to continue falling until arrested by the pins 89 89, which are arranged to hold the blanks, as shown at Fig. 5. From the slide 10 extends downwardly a bar or finger 90, arranged to pass inside the chute and assist in guiding the front blank into position. Through the rear wall of the chute is a rectangular opening 91 for the admission of the plunger 18 to the diagonally-arranged blanks, and a similar opening 17 (somewhat larger than the opening of the previously-formed basket that is to be used as the form) is formed through the front wall of the chute, through which the plunger forces the blanks, and which by its side causes the ends of the blanks 7 to lap around the plunger. The chute from the upper corners of the openings of the front and rear walls is cut away horizontally, as at 92, to permit of the free extending end of the band carried by the plunger passing through the chute 16 without obstruction.

The next operation on the basket after the plunger has carried the blanks from the chute 16 is to complete the wrapping of the band 22 around the edge, and this is accomplished in the following manner after the basket on the plunger has been forced into and firmly held by the previously-formed basket, the baskets as made being nested and held in the basket-holding or rack rods 19, as clearly shown at Figs. 17 and 18, the lower rods being spring-actuated, so as to cause the baskets to be firmly held, and yet admit of their being pushed through the holder step by step as each basket is formed and added to the nest. These basket-holding rods are carried by suitable standards extended upwardly from the frame and are so located as to hold baskets centrally in relation to the plunger and the outside band-wrapping apparatus. This band wrapping or folding apparatus comprises a ring 45, surrounding the baskets and basket-holder and supported by grooved rollers 93, adjustably extending from the frame 94, on which rollers this ring 45 is free to be rotated by the train of gear-wheels 46 in the manner before described. Pivotally connected to the ring 46 are the fingers 43, which extend from the face of the ring bent toward the center and provided with grooved rollers 95 at their bent ends to embrace, bear on, and guide the band 22 as said fingers are carried around the box while held on the plunger 18, and so cause the band to be folded sharply around the corners of the box and laid snugly against its sides, said roller-provided fingers being pressed firmly toward the box by the springs 96 96, which are fastened to the rotatable ring 45. When the blanks (preferably scored on their folding lines) are forced through the opening 17 of the chute 16, they are folded against the plunger by easy bends at the bottom of the box, the completion of these bends taking place when the box is forced by the plunger into the box previously made. This also insures a good gripping action between the boxes, so that the plunger is readily withdrawn from the last box made when retracted to form another box. The stripping of the box from the plunger is also effected by the flange on the band-folders 95. The boxes as thus made have a continuous band, part of which is inside the box and part outside, as clearly shown at Fig. 31, the inside and outside parts of the band being bound together by nails or staples, which are passed through both parts, and the upper edge of the box bound and reinforced by the band.

The next and final operation is nailing or stapling the band on the box, and this is done while the plunger 18 is in the box by the staple forming and driving devices 49 49, carried on the sliding head 50, the plunger acting as an anvil, against which the staples are driven. These stapling devices are of the ordinary construction. They are arranged and operated in pairs, there being a pair located to act on each side of the box, as shown at Fig. 24. The staple-forming parts of all these devices are simultaneously actuated by the slot-cams 97, and the staple-driving mechanisms are then simultaneously actuated by the slot-cams 98, formed in the pivoted plates 99, whose hubs are provided with gear-teeth, into which mesh gear-teeth 100, formed on the edges of the two vertically-sliding bars 58, which bars are connected together at their lower ends by a girder carrying the roller 57, which rests upon and is operated by the cam 56, as before described. The wires are fed to the stapling devices, two wires to each device, from rolls of wire 101, located at the sides of the head 50, being intermittently drawn forward in sufficient quantity to form the staples by the pairs of feeding-rollers 102, which are actuated from the bars 58 through the medium of the connecting-pinion 103, the ratchet and pawl 104, and the pinion 105, which meshes into gear-teeth formed on the edges of the bars 58. This wire-feeding mechanism is clearly shown in detail at Figs. 27, 28, and 29, and Fig. 30 shows how two wires from the feeding-rollers 102, each of which feed four wires, are caused by the guides 106 to be properly presented to the two staple-forming parts of the stapling devices 49. After the stapling of the band on the box is accomplished or during this operation and before the plunger 18 is withdrawn from the box the gripping-jaw 67 is removed from the inner fold of the band and caused to fall back within the plunger, as shown by the dotted lines in Fig. 21, by means of the arm 107, pivoted to one of the stapling devices and actuated by the connecting-link 108, which joins an extension from this arm to the sliding part actuated by the cam-slot 98 of the pivoted plate 99. The end of this arm 107 is thus caused to strike the arm 69 of the plunger and so move it that the jaw 67 is moved away from the band when the staples are being driven, as shown by the dotted lines representing this arm 107 in Fig. 24.

The machine shown is adapted to make rectangular or four-sided baskets; but obviously the invention is not so limited.

It is obvious that if the blanks are not preliminarily or initially folded about the former the entire folding may be effected by the entrance of the former with the blanks into the completed basket, which thereby acts as a mold. This part of the invention is not limited to a stationary basket-holder and a reciprocating former, nor is it my intention generally to limit the invention to the details or form of construction in which I have illustrated it, as obviously many features of the invention may be embodied in other mechanical forms. For instance, it is apparent that the blanks may be delivered in any suitable way to the chute or receptacle, in which they arrange themselves crosswise. Of course the blanks might be delivered to the chute one at a time, dropped in by hand, or otherwise supplied. I have shown four winding-arms for winding the free end of the band around the outside of the basket. This number has been employed because the band is wound once around each of the sides of the basket and then again on the side on which it was first wound. If, however, it be desired to only apply the band to the outside of the basket without overlapping it on one side, a single winding-arm may be employed. As has already been described, I prefer to make the ends of the winding-arms recessed to embrace the edges of the band and preferably in the form of rollers, so that they not only act as winders, but also to effectively strip the completed basket from the form. Although I have suggested that a single winder-arm might be employed, I should in the construction illustrated prefer to use a greater number, as they act to guide the band and hold it against the several sides of the basket.

I claim as my invention—

1. The combination of a holder in which the completed baskets are carried, a plunger or former, mechanism for partially folding the blanks about the former, and means whereby the partially-folded blanks and the former are caused to enter the previously-completed basket to thereby complete the forming or bending of the blanks.

2. The combination of a holder in which the completed baskets are carried, a plunger or former, mechanism for partially folding the blanks about the former, means whereby the partially-folded blanks and the former are caused to enter the previously-completed basket to thereby complete the forming or bending of the blanks, and mechanism for applying the bands.

3. The combination of a holder in which the completed baskets are carried, a plunger or former, mechanism for partially folding the blanks about the former, means whereby the partially-folded blanks and the former are caused to enter the previously-completed basket to thereby complete the forming or bending of the blanks, mechanism for applying the bands, and nailing mechanism.

4. The combination of a stationary holder in which the completed baskets are carried or nested, a reciprocating former or plunger adapted to enter the previously-formed basket and mechanism for applying the blanks to the former and partially folding them thereon, the final folding being completed by the entrance into the previously-formed basket.

5. The combination of a stationary holder in which the completed baskets are carried or nested, a reciprocating former or plunger adapted to enter the previously-formed basket, mechanism for applying the blanks to the former and partially folding them thereon, the final folding being completed by the entrance into the previously-formed basket, and mechanism for applying the bands.

6. The combination of a stationary holder in which the completed baskets are carried or nested, a reciprocating former or plunger adapted to enter the previously-formed basket, mechanism for applying the blanks to the former and partially folding them thereon, the final folding being completed by the entrance into the previously-formed basket, mechanism for applying the bands, and nailing mechanism.

7. The combination of a reciprocating plunger or former, means for holding blanks or veneers in the path of the plunger, a folder, as the edges of a hole formed in a plate of the blank-holding means, for folding the blanks toward the sides of the plunger as the plunger passes through said opening, and a basket holder or rack for holding the baskets nested with the last-made basket of the nest in position to receive the blanks carried forward by the plunger and to act as a mold to cause said blanks to complete the shaping of the basket.

8. The combination of a reciprocating plunger or former, means for holding blanks or veneers in the path of the plunger, a folder, as the edges of a hole formed in a plate of the blank-holding means, for folding the blanks toward the sides of the plunger as the plunger passes through said opening, a basket holder or rack for holding the baskets nested with the last-made basket of the nest in position to receive the blanks carried forward by the plunger and to act as a mold to cause said blanks to complete the shaping of the basket, means for applying a binding-band to the edges of the sides of the blanks, and means for nailing or stapling said band at the sides of the blank to complete the basket, the basket thus completed being, upon the withdrawal of the plunger, added to the nest of baskets to act as a mold for the succeeding basket.

9. The combination of a reciprocating plunger or former, means for holding blanks or veneers in the path of the plunger, a folder, as the edges of a hole formed in a plate of the blank-holding means, for folding the blanks toward the sides of the plunger as the plunger passes through said opening, a basket holder or rack for holding the baskets nested with the last-made basket of the nest in position to receive the blanks carried forward by the plunger and to act as a mold to cause said blanks to complete the shaping of the basket, means for applying a binding-band to the plunger in such position as to be inside of the edges of the blanks folded against the plunger, with the end of the band extending from one side of the plunger, means for folding this extending end of the band around the basket at its edges and over the inside portion of the band, and means for securing, as by nails or staples, the band to the sides of the basket, the basket thus completed being, upon the withdrawal of the plunger, added to the nest of baskets to act as a mold for the succeeding basket.

10. The combination of a hopper for holding the blanks, mechanism for discharging two blanks at a time therefrom, and means for causing the two blanks to assume an angular relation with reference to each other and holding them in such position.

11. The combination of a hopper for holding the blanks, mechanism for discharging two blanks at a time therefrom, means for causing the two blanks to assume an angular relation with reference to each other and holding them in such position, a former or plunger, and means for folding such blanks about the former.

12. The combination of a hopper for holding the blanks, mechanism for discharging two blanks at a time therefrom, means for causing the two blanks to assume an angular relation with reference to each other and holding them in such position, a former or plunger, means for folding such blanks about the former, band-applying mechanism and nailing mechanism.

13. The combination of a hopper for holding the blanks, mechanism for discharging two blanks at a time therefrom, means for causing the two blanks to assume an angular relation with reference to each other and holding them in such position, a former or plunger, means for partially folding such blanks about the former, a mold for completing the formation of the blanks on the former, band-applying mechanism and nailing mechanism.

14. The combination of the hopper for holding the blanks, a blank-discharge pusher having two projections thereon of different lengths, one adapted to discharge the outermost blank and the other the adjacent blank from the hopper, means for separating the two blanks so discharged and means for causing them to assume an angular relation to each other.

15. The combination of the hopper for holding the blanks, a blank-discharge pusher having two projections thereon of different lengths, one adapted to discharge the outermost blank and the other the adjacent blank from the hopper, means for separating the two blanks so discharged, means for causing them to assume an angular relation to each other, a former or plunger, means for folding the banks about the former, band-applying mechanism and nailing mechanism.

16. The combination of a hopper for holding the blanks, means for discharging two blanks at a time from the hopper, and guide-pins for causing the two blanks to assume an angular relation to each other.

17. The combination of a hopper for holding the blanks, a pusher for discharging two of the blanks from the hopper, one in advance of the other, a separator operated to act between the two discharged blanks, a vertical chute having side flanges down either side of which the two blanks fall, stop-pins projecting from the front and rear walls of the chute for arresting one end of each of the blanks and pins for guiding and holding the other ends of the blanks to cause the blanks to assume opposite angular positions.

18. The combination of a hopper for holding the blanks, a chute at the discharge end of the hopper, a blank-discharging device for conveying two blanks at a time from the hopper into the chute, means, as stop and guide pins, for causing the two blanks to assume reverse angular positions opposite openings in the front and rear walls of the chute, and a plunger or former operated to pass through said openings in the chute, carry the blanks from the chute and cause them to be folded against the side of the plunger during their exit through the opening of the front wall.

19. The combination of a hopper for holding the blanks, a chute at the discharge end of the hopper, a blank-discharging device for conveying two blanks at a time from the hopper into the chute, means, as stop and guide pins, for causing the two blanks to assume reverse angular positions opposite openings in the front and rear walls of the chute, said openings having in their upper parts lateral slots extending entirely through one side of the chute, and a plunger carrying a band, the end of which extends from its side, the plunger being operated to pass through the openings of the chute to carry the blanks therefrom and fold the blanks against the sides of the plunger, the extending end of the band passing through the lateral slots of the chutes.

20. The combination of a hopper for holding the blanks or veneers, a vertical rectangular chute arranged at the discharge end of the hopper, a pusher for discharging two blanks at a time from the hopper into the chute, stop and guide pins in the chute for causing the two blanks to assume reverse angular positions, a plunger operated to carry the blank through a hole in the front wall of the chute, and a vertically-moving bar or finger for guiding the front blank into position onto the guide-pins and operated to move out of the path of the blanks when they are acted upon by the plunger.

21. The combination of a hopper for holding the blanks or veneers on edge and provided with means for forcing the blanks toward one of its ends, a vertically-reciprocated pusher provided with two sets of discharging-pins arranged to discharge two blanks from the hopper, the front one in advance of the second one, means for moving and holding the pusher away from the blanks during the ascent of the pusher, a chute down which the blanks drop as discharged from the hopper, means for causing a separation of the blanks in the chute and a plunger actuated to force the blanks out of the chute through a hole formed in its front wall.

22. The combination of a hopper for holding the wood blanks or veneers on edge and provided with means for forcing the blanks toward one of its ends, a vertically-reciprocated pusher provided with two sets of discharging-pins arranged to discharge two blanks from the hopper, the front one in advance of the second one, means for moving and holding the pusher away from the blanks during the ascent of the pusher, a chute down which the blanks drop as discharged from the hopper, a separator operated to act between the two discharge-blanks, a vertical chute having side flanges down either side of which the two blanks fall, stop-pins projecting from the front and rear walls of the chute for arresting one end of each of the blanks and pins for guiding and holding the other ends of the blanks to cause the blanks to assume opposite angular positions.

23. The combination of a hopper for holding the wood blanks or veneers on edge and provided with means for forcing the blanks toward one of its ends, a vertically-reciprocated pusher provided with two sets of discharging-pins arranged to discharge two blanks from the hopper, the front one in advance of the second one, means for moving and holding the pusher away from the blanks during the ascent of the pusher, a chute down which the blanks drop as discharged from the hopper, a separator operated to act between the two discharged blanks, a vertical chute having side flanges down either side of which the two blanks fall, stop-pins projecting from the front and rear walls of the chute for arresting one end of each of the blanks, pins for guiding and holding the other ends of the blanks to cause the blanks to assume opposite angular positions, means for actuating the pusher embracing a pivoted lever, and a cam-slotted slide connected to the lever and arranged to act on the separator to cause it to bear against the rear of the front blank and allow the second blank to pass over its edge when the two blanks are pushed down by the pusher into the field of action of the separator.

24. The combination of a hopper for holding the blanks, a chute at the discharge end of the hopper, a blank-discharging device for conveying two blanks at a time from the hopper into the chute, means, as stop and guide pins for causing the two blanks to assume reverse angular positions opposite openings in the front and rear walls of the chute, said openings having from their upper parts lateral slots extending entirely through one side of the chute, a plunger carrying a binding-band, the end of which extends from its side, said plunger being operated to pass through the openings of the chute to carry the blanks therefrom and fold the blanks against the sides of the plunger, said extending end of the band passing through the lateral slots of the chutes, means for applying a band to the rear end of the plunger, and clamping and gripping jaws on the plunger for holding the band thereon.

25. The combination of a hopper for holding the blanks or veneers, a vertical rectangular chute arranged at the discharge end of the hopper, a pusher for discharging two blanks at a time from the hopper into the chute, a separator for separating the two fed blanks as they enter the chute, stop and guide pins in the chute for causing the two blanks to assume reverse angular positions, a plunger operated to carry the blank through a hole in the front wall of the chute, a vertically-moving bar or finger for guiding the front blank into position onto the guide-pins and operated to move out of the path of the blanks when they are acted upon by the plunger, and means for applying a band to the plunger wound around its rear end with the end of the band extending from the side of the plunger.

26. The combination of a hopper for holding blanks or veneers, a vertical rectangular chute arranged at the discharge end of the hopper, a pusher for discharging two blanks at a time from the hopper into the chute, stop and guide pins in the chute for causing the two blanks to assume reverse angular positions, a plunger operated to carry the blank through a hole in the front wall of the chute, and a vertically-moving bar or finger for guiding the front blank into position onto the guide-pins and operated to move out of the path of the blanks when they are acted upon by the plunger, a basket holder or rack holding baskets previously formed into the last one of which the blanks carried forward by the plunger are inserted, and a folding device for wrapping the extended end of the band around the sides of the basket on the plunger.

27. The combination of a hopper for holding the blanks, a chute at the discharge end of the hopper, a blank-discharging device for conveying two blanks at a time from the hopper into the chute, means, as stop and guide pins, for causing the two blanks to assume reverse angular positions opposite openings in the front and rear walls of the chute, said openings having from their upper parts lateral slots extending entirely through one side of the chute, a plunger carrying a binding-band, the end of which extends from its side, said plunger being operated to pass through the openings of the chute to carry the blanks therefrom and fold the blanks against the sides of the plunger, said extending end of the band passing through the lateral slots of the chutes, a basket holder or rack for holding baskets previously formed into the last one of which the blanks carried forward by the plunger are inserted, and a folding device for wrapping the extending end of the band around the sides of the basket on the plunger, and a nailing or stapling device for driving nails or staples through the band and sides of the basket.

28. The combination of a band bender or winder to which the band is delivered and upon which it is wound, a former or plunger, and means for transferring the wound end of the band from the winder to the former.

29. The combination of a band bender or winder, to which the band is delivered and upon which it is wound, a former or plunger, means for transferring the wound end of the band from the winder to the former, and means for then applying the basket-blanks to the former.

30. The combination of a band bender or winder to which the band is delivered and upon which it is wound, a former or plunger, means for transferring the wound end of the band from the winder to the former, means for then applying the basket-blanks to the former, and nailing mechanism.

31. The combination of a band-hopper, means for discharging a band therefrom, a winder to which one end of the discharged band is delivered and upon which one end of the band is wound, a former or plunger, means for transferring the wound end of the band to the plunger, means for then applying the basket-blanks to the plunger, mechanism for then winding the free or unwound end of the band about the outer edges of the blanks.

32. The combination of a band-hopper, means for discharging a band therefrom, a winder to which one end of the discharged band is delivered and upon which one end of the band is wound, a former or plunger, means for transferring the wound end of the band to the plunger, means for then applying the basket-blanks to the plunger, mechanism for then winding the free or unwound end of the band about the outer edges of the blanks, and nailing mechanism.

33. The combination of a band-hopper, a folder or winder for bending the band into shape corresponding to the shape of the basket to be formed, a pusher for discharging a band from the hopper and presenting its end to the folder, and a reciprocating plunger actuated to take the band from the folder.

34. The combination of a band-hopper, a folder for bending the band into shape comprising a series of pins and a cramping-jaw extending from a sliding rear plate through a longitudinally stationary front plate, a pusher for discharging a band from the hopper and presenting its end to the cramping-jaw of the folder, means for intermittently rotating the folder, and a reciprocating plunger provided with a cramping-jaw and a gripping-jaw, said plunger being actuated to depress the pins and cramping-jaw of the folder within the face of the front plate and so cause the band to be transferred from the pins to the plunger with the end transferred to the cramping-jaw of the plunger and also to cause the gripping-jaw of the plunger to move over the band to hold the free part of the band against the plunger.

35. The combination of a hopper for holding the blanks, means for discharging two blanks at a time from the hopper, means, as guide-pins, for causing the two blanks to assume reverse angular positions, a band-hopper, a folder for bending the band into shape corresponding to the shape of the basket to be formed, a pusher for discharging a band from the hopper and presenting its end to the folder, a reciprocating plunger actuated to take the band from the folder and then to act on the two blanks to cause them to be folded against the sides of the plunger over the part of the band held on the plunger.

36. A band-feed hopper curved or bent at its delivery end to form a continuous band-holding chamber curved at one end and in which the bands may lie with their flat or side faces in contact and means for pushing the bands forward therein whereby the bands standing on edge in the straight part of the hopper are gradually turned to a position at right angles, or substantially so, in combination with means for discharging the bands from the end of the curved band-holding chamber.

37. A band-feed hopper curved or bent at its delivery end to form a continuous band-holding chamber curved at one end and in which the bands may lie with their flat or side faces in contact, means for pushing the bands forward therein whereby the bands standing on edge in the straight part of the hopper are gradually turned to a position at right angles, or substantially so, in combination with means for discharging the bands from the end of the curved band-holding chamber, means for applying the band and basket blanks to a former, and nailing mechanism.

38. A band-feed hopper reduced in width to less than the length of the bands and curved or bent at its delivery end, and means for pushing the bands forward therein whereby the bands standing on edge in the straight part of the hopper are gradually turned to a position at right angles, or substantially so, in combination with means for discharging the bands from the hopper.

39. The combination with a band-holder, in which the bands are placed on edge side by side, curved at its front or discharge end, a pusher or feeder in the hopper for pressing the bands along the hopper and around its curve causing them to assume horizontal flatwise positions in the lower end of the hopper, a pusher for discharging the bands one at a time from the hopper onto a table projecting from the front thereof and a spring-actuated roller for holding one end of the band onto the table.

40. The combination with a band-holder, in which the bands are placed on edge side by side, curved at its front or discharge end, a pusher or feeder in the hopper for pressing the bands along the hopper and around its curve causing them to assume horizontal flatwise positions in the lower end of the hopper, a pusher for discharging the bands one at a time from the hopper onto a table projecting from the front thereof, a spring-actuated roller for holding one end of the band onto the table, a folding or winding device having a clamping-jaw situated at the corner of the table and into which the end of the band is pushed by the pusher, and means for rotating the winding device to cause the band to be wound one turn around it.

41. The combination with a band-holder, in which the bands are placed on edge side by side, curved at its front or discharge end, a pusher or feeder in the hopper for pressing the bands along the hopper and around its curve causing them to assume horizontal flatwise positions in the lower end of the hopper, a pusher for discharging the bands one at a time from the hopper, the forward front end of the bottom of the hopper and rectangular bend being cut away at one side to allow of a free separation of the bands at their ends which are opposite the ends under the control of feeding mechanism.

42. The combination with a band-holder, in which the bands are placed on edge side by side, curved at its front or discharge end, a pusher or feeder in the hopper for pressing the bands along the hopper and around its curve causing them to assume horizontal flatwise positions in the lower end of the hopper, a pusher for discharging the bands one at a time from the hopper onto a table projecting from the front thereof, a spring-actuated roller for holding one end of the band onto the table, a folding or winding device having a clamping-jaw situated at the corner of the table and into which the end of the band is pushed by the pusher, means for rotating the winding device to cause the band to be wound one turn around it, and a reciprocating plunger actuated to back up against the folding or winding device and to receive the folded band on its end from such folding or winding device.

43. The combination of a hopper for holding the blanks, a chute at the discharge end of the hopper, a blank-discharging device for conveying two blanks at a time from the hopper into the chute, means, as stop and guide pins, for causing the two blanks to assume reverse diagonal positions opposite openings in the front and rear walls of the chute, said openings having from their upper parts lateral slots extending entirely through one side of the chute, in combination with a band-holder in which the bands are placed on edge side by side, curved at its front or discharge end, a pusher or feeder in the hopper for pressing the bands along the hopper and around its curve causing them to assume horizontal flatwise positions in the lower end of the hopper, a pusher for discharging the bands one at a time from the hopper, the forward front end of the bottom of the hopper and rectangular bend being cut away at one side to allow of a free separation of the bands at their ends which are opposite the ends under the control of feeding mechanism, and a reciprocating plunger actuated to back up against the folding or winding device to receive the folded band on its end from such folding or winding device with the free end of the band projecting from its side and then to move forward and pass through the openings of the chute and carry the blanks therefrom and fold them against the sides of the plunger with the edges of the blanks over the band on the plunger.

44. The combination with a basket holder or rack, for holding a series of baskets nested in it, a plunger then in the last-formed basket of the series and which then has a binding-band extending from one side of it, of folding-fingers arranged to then bear on the binding-band, and means for causing such fingers to travel around the basket to fold the band closely to the sides thereof.

45. The combination with a basket holder or rack, for holding a series of baskets nested in it, a plunger then in the last-formed basket of the series which has a binding-band extending from one side of it, of folding-fingers then arranged to bear on the binding-band and caused to travel around the basket to fold the band closely to the sides thereof, a series of nailing or stapling devices carried by a sliding head of the machine and held in inoperative position when the folding-fingers are in action and moved forward into position to drive nails or staples through the band folded on the basket, means for actuating the folding-fingers and means for actuating the sliding head and nailing or stapling devices carried thereby.

46. The combination of an annular bandwinder having laterally-projecting winding-arms and an annular nailer mechanism through or into the central opening of which the winding-arms extend.

47. The combination of an annular band-winder having laterally-projecting winding-arms and a laterally-movable annular nailer mechanism through or into the central opening of which the winding-arms extend.

48. The combination of a basket-holding rack, a plunger having in one of its positions basket-blanks formed on it and held in the rack and a band then carried by the plunger extending from one side, a series of folding-fingers then surrounding the basket and projecting from the face of a rotatable plate or ring, means for rotating the fingers around the basket, and a series of nailing or stapling devices arranged in a sliding head and surrounding the projecting folding-fingers, and means for moving the head to bring the nailing or stapling devices into and out of operative positions and means for actuating the nailing or stapling devices when in operative position.

49. The combination of a band-hopper, means for discharging the bands therefrom edgewise one at a time, a band-winder having a gripping-jaw into which one end of a discharged band enters as it leaves the hopper, a plunger or former having a corresponding gripper-jaw, means for moving the plunger axially to force back the winder and thereby transfer the part of the band wound thereupon to the plunger with its end in the gripping-jaw of the plunger, and means for at the time of such transference of the band, operating the band-discharging devices whereby as the wound band leaves the winder the end of another band from the hopper follows into the gripping-jaw of the winder, substantially as set forth.

50. The combination of a holder for a completed basket, a former and mechanism for bringing the former into the basket, whereby the completed basket acts as a form or mold to bend into proper shape the blanks applied to the former.

51. The combination of a stationary holder for a completed basket, a reciprocating former, and mechanism for bringing the former into the basket, whereby the completed basket acts as a form or mold to bend into proper shape the blanks applied to the former.

52. The combination of a holder for a completed basket, a former, mechanism for applying the blanks to the former and mechanism for bringing the former with the blanks into the basket, whereby the completed basket acts as a form or mold to bend the blanks into proper shape about the former.

53. The combination of a holder for a completed basket, a former, mechanism for applying the blanks to the former, mechanism for bringing the former with the blanks into the basket, whereby the completed basket acts as a form or mold to bend the blanks into proper shape about the former, band-applying mechanism and nailing mechanism.

54. A receptacle or chute having a stop or projection against which the edge of a blank delivered to the chute strikes and about which it rocks, and other stops or projections which arrest the rocking movement of the blank and hold it in the desired position.

55. A receptacle or chute having two series of stops or projections arranged in different parallel planes, each series having a stop upon which the edge of one of two blanks delivered to the chute strikes and about which it rocks and other stops which arrest the blank and hold it in the desired position, whereby the blanks delivered to the chute may be arranged one across the other.

56. A band-hopper curved at one end and cut away or narrower at the curved end than at the other end or part of the hopper whereby the angular position of the band at the delivery end of the hopper is changed from that which it occupied at the opposite end and the free end of the bands at the delivery end permitted to separate, and means for discharging the band as required at the delivery end of the hopper.

57. A band-hopper curved at its delivery end to form a continuous band-holding chamber curved at one end and in which the bands may lie with their flat or side faces in contact, means for advancing the bands in the hopper toward the delivery end and means for discharging the bands one by one as required from the curved delivery end of the hopper.

58. The combination of a non-rotary former, means for folding the blanks about it, and a rotary winder for winding the band around the edges of the folded blanks.

59. The combination of a non-rotary former, means for folding the blanks about it, a rotary winder for winding the band around the edges of the folded blanks, and nailing mechanism.

60. The combination of a non-rotary former, mechanism whereby one end of the band is disposed around the sides of the former, mechanism for applying the blanks to the former and bending them into proper shape and a rotary winder for winding the free end of the band around the outside edges of the folded blanks.

61. The combination of a non-rotary former, mechanism whereby one end of the band is disposed around the sides of the former, mechanism for applying the blanks to the former and bending them into proper shape, a rotary winder for winding the free end of the band around the outside edges of the folded blanks, and nailing mechanism.

62. The combination of a hopper adapted to hold basket-blanks arranged parallel with their flat faces contiguous, means for discharging two blanks so arranged from said hopper, and means for causing the blanks to assume the angular position with reference to each other in which they are to be bent up to form the basket.

63. The combination of a hopper adapted to hold basket-blanks arranged parallel with their flat faces contiguous, means for discharging two blanks so arranged from said hopper, means for separating the two blanks, and means for causing the blanks to assume the angular position with reference to each other in which they are to be bent up to form the basket.

64. The combination of a hopper adapted to hold basket-blanks arranged parallel with their flat faces contiguous, means for discharging two blanks so arranged from said hopper, means for causing the blanks to assume the angular position with reference to each other in which they are to be bent up to form the basket and a former about which the blanks are bent or folded.

In testimony whereof I have hereunto subscribed my name.

SYLVANUS D. LOCKE.

Witnesses:
JAMES P. J. S. NORRIS,
M. W. CLEPHANE.